United States Patent
Yoon

(10) Patent No.: US 10,338,675 B2
(45) Date of Patent: Jul. 2, 2019

(54) SELECTIVE COLOR SENSING FOR MOTION TRACKING

(71) Applicant: Facebook Technologies, LLC, Menlo Park, CA (US)

(72) Inventor: Youngshik Yoon, Cupertino, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 107 days.

(21) Appl. No.: 15/432,786

(22) Filed: Feb. 14, 2017

(65) Prior Publication Data

US 2018/0232047 A1    Aug. 16, 2018

(51) Int. Cl.
| | |
|---|---|
| G06K 9/00 | (2006.01) |
| G06F 3/01 | (2006.01) |
| G06T 7/246 | (2017.01) |
| G06T 7/73 | (2017.01) |
| G06T 7/90 | (2017.01) |
| G06T 7/80 | (2017.01) |
| G06F 3/03 | (2006.01) |

(52) U.S. Cl.
CPC ............ *G06F 3/012* (2013.01); *G06F 3/0325* (2013.01); *G06T 7/246* (2017.01); *G06T 7/73* (2017.01); *G06T 7/80* (2017.01); *G06T 7/90* (2017.01); *G06T 2207/10024* (2013.01); *G06T 2207/10152* (2013.01)

(58) Field of Classification Search
CPC ... A61B 5/0275; A61B 5/6815; A61B 5/0059; A61B 5/02416; A61B 5/029
USPC ................ 382/103; 345/175, 176, 166, 179; 600/431, 476, 407, 484, 504, 508; 424/9.1
See application file for complete search history.

(56) References Cited

U.S. PATENT DOCUMENTS

| | | | | |
|---|---|---|---|---|
| 9,638,591 | B1* | 5/2017 | Sarcia ..................... | G01L 1/246 |
| 2010/0016731 | A1* | 1/2010 | Eggers ................. | A61B 5/0059 |
| | | | | 600/476 |
| 2011/0007035 | A1* | 1/2011 | Shai ........................ | G06F 3/014 |
| | | | | 345/179 |
| 2013/0241835 | A1* | 9/2013 | Lee ..................... | G06F 3/03543 |
| | | | | 345/166 |
| 2014/0276034 | A1* | 9/2014 | Eggers ................. | A61B 5/0275 |
| | | | | 600/431 |
| 2016/0284316 | A1* | 9/2016 | Kestelli ................... | G06F 1/163 |
| 2017/0169185 | A1* | 6/2017 | Weng ..................... | G06F 19/00 |
| 2017/0205876 | A1* | 7/2017 | Vidal ..................... | G01S 17/88 |

* cited by examiner

*Primary Examiner* — Charlotte M Baker
(74) *Attorney, Agent, or Firm* — Morgan, Lewis & Bockius LLP

(57) ABSTRACT

An electronic device is configured to select a first set of one or more distinct wavelengths for tracking a first portable device in communication with the electronic device; and, subsequent to selecting the first set of one or more distinct wavelengths for tracking the first portable device, initiate the first portable device to emit light of the first set of one or more selected wavelengths; receive information identifying one or more respective intensities of light, detected by the one or more optical sensors, for the first set of one or more selected wavelengths; and determine a position of the first portable device based on the information identifying the one or more respective intensities of light, detected by the one or more optical sensors, for the first set of one or more selected wavelengths. A method for determining a position of the first portable device is also described.

18 Claims, 14 Drawing Sheets

|  | Display device 205 | Controller 260-1 | Controller 260-2 |
|---|---|---|---|
| Blue |  |  | ● |
| Green | ○ |  |  |
| Red |  | ● |  |
| NIR | ○ |  |  |

Figure 6D

SELECTIVE COLOR SENSING FOR MOTION TRACKING

TECHNICAL FIELD

This relates generally to display devices, and more specifically to head-mounted display devices.

BACKGROUND

Head-mounted display devices (also called herein head-mounted displays) are gaining popularity as means for providing visual information to user. Accurate motion tracking of head-mounted displays and associated devices (e.g., controllers) is important for improving virtual reality or augmented reality experience for users, as visual feedback is determined based on the position and/or movement of head-mounted displays and associated devices. Imprecise determination of a position and/or movement of a head-mounted display or associated devices can lead to a mismatch between a movement of a head-mounted display or associated devices and a visual feedback provided to the user, which reduces the virtual reality or augmented reality experience.

SUMMARY

Accordingly, there is a need for improved methods for tracking motion of head-mounted displays and associated devices (e.g., control devices).

As explained above, tracking of components, such as head-mounted displays and controllers, is important in providing virtual-reality or augmented reality experience, because images (or media) presented by the head-mounted displays are selected based on a position of a head-mounted display. For example, when the head-mounted display turns left (based on a left-ward rotation of the head of a user wearing the head-mounted display), an image that corresponds to the left side of the user is displayed, and when the mead-mounted display turns right (based on a right-ward rotation of the head of the user), an image that corresponds to the right side of the user is displayed, thereby providing a visual feedback that mimics a real world environment.

When optical signals are used for tracking a position and/or a movement of a head-mounted display or an associated device, the optical signals are subject to interferences by ambient light and light emitted by other devices, which can reduce the accuracy in determining the position and/or the movement of the head-mounted display or an associated device.

The above deficiencies and other problems are reduced or eliminated by the disclosed devices and methods. In some embodiments, the disclosed methods are used with a head-mounted display device. In some embodiments, the disclosed methods are used with a controller.

In accordance with some embodiments, an electronic device, in communication with a first portable device and one or more optical sensors, includes one or more processors and memory storing one or more programs. The one or more programs include instructions, which, when executed by the one or more processors, cause the electronic device to select a first set of one or more distinct wavelengths for tracking the first portable device; and, subsequent to the selection, initiate the first portable device to emit light of the first set of one or more distinct wavelengths for tracking the first portable device, receive information identifying intensities for the first set of one or more selected distinct wavelengths from the one or more optical sensors, and determine a position of the first portable device based on the information identifying respective intensities of light, detected by the one or more optical sensors, for the first set of one or more selected wavelengths.

In accordance with some embodiments, an interactive display device includes an electronic device described herein and a first portable device that is distinct and separate from the electronic device.

In accordance with some embodiments, a method is performed by an electronic device in communication with a first portable device and one or more optical sensors. The method includes selecting, by the electronic device, a first set of one or more distinct wavelengths for tracking the first portable device. The method also includes, subsequent to the selection, the electronic device initiating the first portable device to emit light of the first set of one or more selected wavelengths and receiving information detected by the one or more optical sensors identifying one or more respective intensities of light for the first set of one or more selected wavelengths. The method further includes the electronic device determining a position of the first portable device based on the information identifying the one or more respective intensities of light, detected by the one or more optical sensors, for the first set of one or more selected wavelengths.

Thus, the disclosed embodiments provide devices and methods for accurately and rapidly track a motion of a portable device, such as a head-mounted display and an associated device (e.g., a controller).

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 6D illustrates selection of a set of one or more distinct wavelengths for emission by a respective locator.

Figure 1:
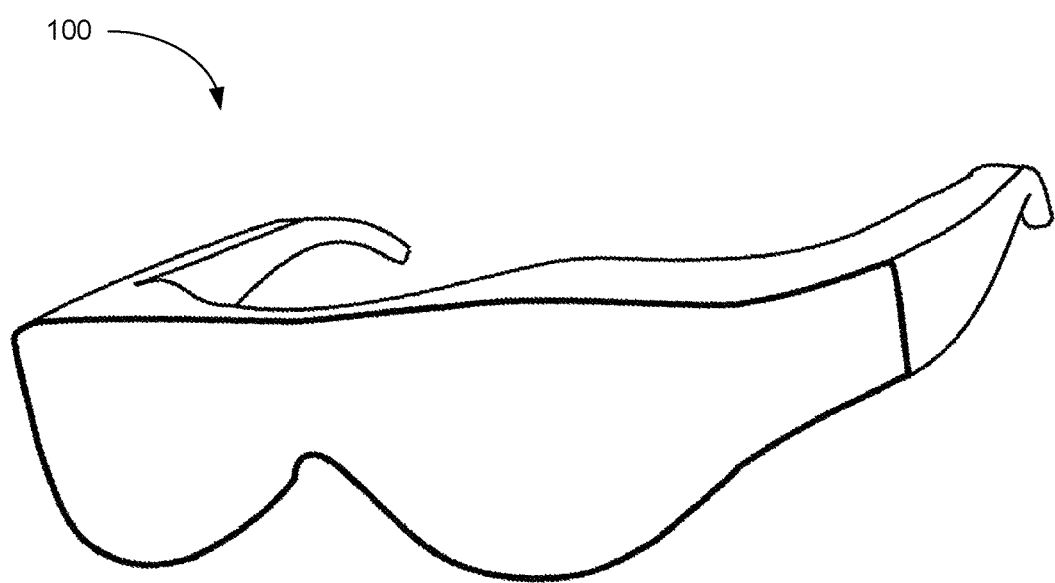
FIG. 1 is a perspective view of a display device in accordance with some embodiments.

These figures are not drawn to scale unless indicated otherwise.

DETAILED DESCRIPTION

Head-mounted displays and associated devices often require a motion tracker to determine a position of such devices. Projecting images based on the positions of a display device (e.g., projecting an image of a left-side scene when the head turns left and projecting an image of a right-side scene when the head turns right) improves the user experience with the provided virtual reality or augmented reality environment. The position of the display device needs to be determined rapidly to provide a realistic visual feedback.

The disclosed embodiments, by utilizing a plurality of color selective light sources, provide display devices (including those that can be head-mounted) whose positions can be determined rapidly, which, in turn, improves the user experience with such devices.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2A. In some embodiments, display device 100 includes additional components not shown in FIG. 2A.

Figure 2A:
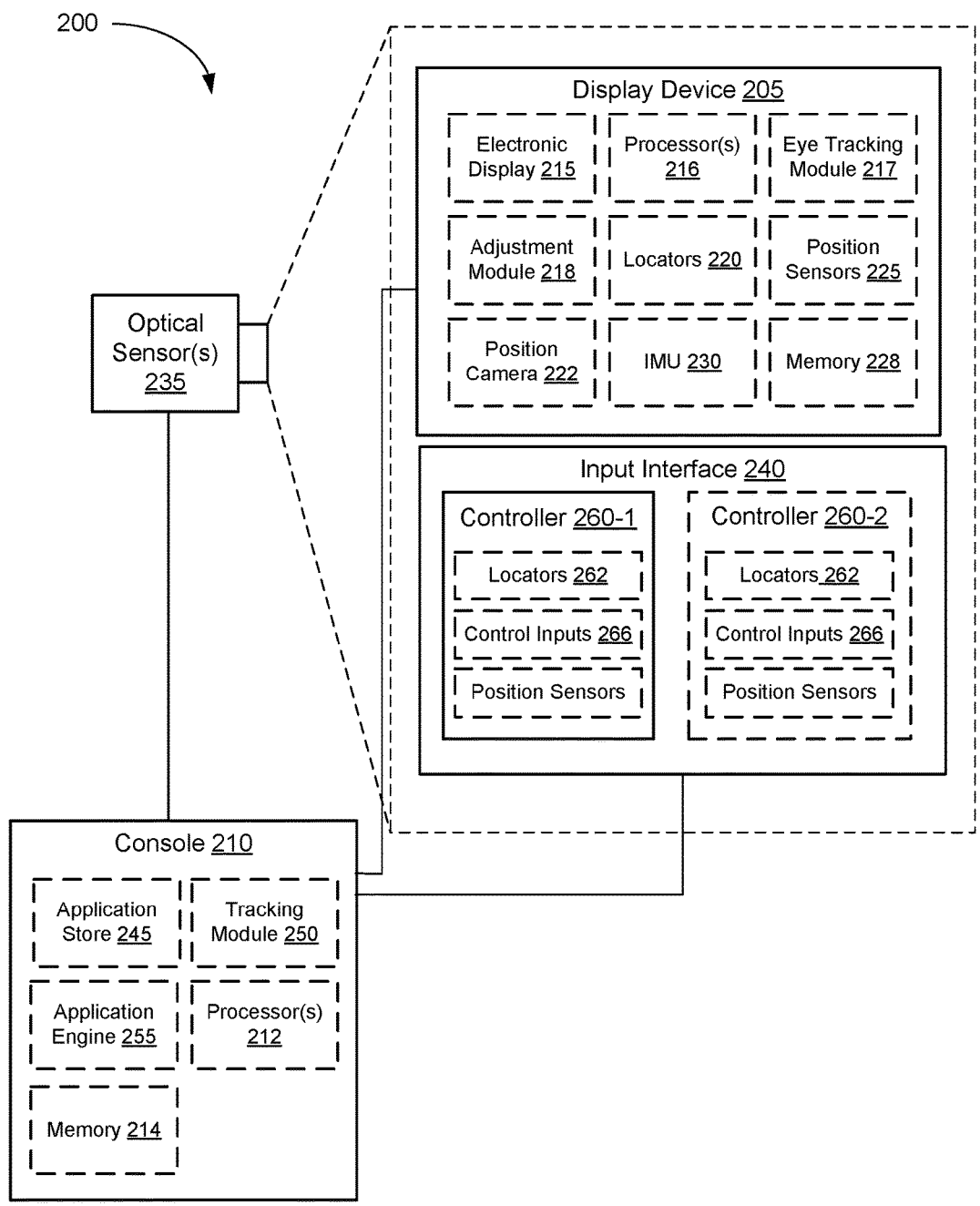
FIG. 2A is a block diagram of a system including a display device in accordance with some embodiments.

FIG. 2A is a block diagram of system 200 (also called herein an interactive display device) in accordance with some embodiments. The system 200 shown in FIG. 2A includes display device 205 (which corresponds to display device 100 shown in FIG. 1), one or more optical sensors 235, and input interface 240 (e.g., controller 260-1 and/or controller 260-2) that are each coupled to console 210. While FIG. 2A shows an example of system 200 including one display device 205, one or more optical sensors 235, and input interface 240 with two controllers 260-1 and 260-2, in other embodiments, any number of these components may be included in system 200. For example, there may be multiple display devices 205 each having associated input interface 240 with one or more controllers 260 and being monitored by one or more optical sensors 235, with each display device 205, controllers 260, and optical sensors 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores the following programs, modules and data structures, or a subset or superset thereof:
 instructions for causing locators 220 to emit light;
 instructions for causing position camera 222 to receive light; and
 instructions for processing electrical signals from position camera 222 to determine a position of controller 260 (e.g., controller 260-1 or controller 260-2).

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user). The adjustable electronic display element may be flat, cylindrically curved, or have some other shape.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from their retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image—and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, adjustment module 218 adjusts an output (i.e. the generated image frame) of electronic display 215 based on the detected locations of the pupils. In some embodiments, adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses, or some combination thereof.

In some embodiments, adjustment module 218 is configured to instruct the display elements to not use every pixel (e.g., one or more light emission devices), such that black spaces aperture the diverging light to abut the image together from the retinal perspective. In addition, in some embodiments, gaps are created between the pixel groups to match divergence of the light source array and the magnification of the group of pixels as it transverses through the optical system and fully fills the lenslet. In some embodiments, adjustment module 218 determines, for a given position of an eye, which pixels are turned on and which pixels are turned off—with the resulting image being projected on the eye's retina.

Locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof. In some embodiments, locators 220 comprise only a single locator. In some embodiments, locators 220 comprise a plurality of locators.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial measurement unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

In some embodiments, system 200 includes one or more optical sensors 235. In some embodiments, optical sensors 235 include one or more still cameras, one or more video cameras, other devices for capturing images, one or more spectrometers, one or more spectrographs, other devices for probing intensity of light as a function of the electromagnetic spectrum, or some combination thereof.

One or more optical sensors 235 generate calibration data. Calibration data includes one or more images showing observed positions of locators 220 and/or locators 262 that are detected by one or more optical sensors 235 (e.g., still cameras or video cameras). Additionally, optical sensors 235 may include one or more filters (e.g., used to increase signal to noise ratio). In some embodiments, the one or more filters are conditionally activated (e.g., the one or more filters are inserted in, and removed from, an optical path based on instructions from console 210, or the one or more filters are electrically activated). Optical sensors 235 are configured to optionally detect light emitted or reflected from locators 220 and/or locators 262 in a field of view of optical sensors 235. In embodiments where locators 220 and/or locators 262 include passive elements (e.g., a retroreflector), optical sensors 235 may include a light source that illuminates some or all of locators 220 and locators 262, which retro-reflect the light towards the light source in optical sensors 235. Calibration data is communicated from optical sensors 235 to console 210, and in some embodiments, optical sensors 235 receive one or more calibration parameters from console 210 to adjust one or more imaging parameters (e.g., focal length, focus, frame rate, ISO, sensor temperature, shutter speed, aperture, etc.). In some embodiments, one or more optical sensors 235 generate calibration data in accordance with calibration parameters received from console 210.

In some embodiments, calibration data also includes data related to ambient light conditions. In some embodiments, optical sensors 235 (e.g., spectrometers) probe intensity of ambient light conditions including outdoor lighting (e.g., sunlight), indoor lighting, and light emitted by display device 205, controllers 260-1 and 260-2 and/or other light sources. In some embodiments, the data includes intensity of light as a function of the electromagnetic spectrum (e.g., wavelength, or equivalent frequency or energy) within a range of interest, such as in the visible light range and near-infrared (NIR) light range. The data generated by optical sensors 235 is communicated from optical sensors 235 to console 210. In some embodiments, display device 205 and controllers 260-1 and 260-2 receive one or more parameters from console 210 in order to emit light by locators 220 and 262 with a set of distinct one or more wavelengths selected by console 210.

As used herein, light emitted at "a distinct wavelength" refers to a representative wavelength of an emission band that is non-overlapping, or is partially overlapping with another emission band where the emission bands can be distinguished from each other. For example, the emission bands can be detected by methods know in the art (e.g., with a spectrometer) and have distinct features so that the emission bands can be distinguished from each other. In some embodiments, the distinct wavelength is a peak wavelength, a wavelength having a maximum intensity within the emission band, or a center wavelength of the emission band. In some embodiments, a distinct wavelength is separated from another distinct wavelength by at least, e.g., 1 nm, 2 nm, 4 nm, 6 nm, 8 nm, 10 nm, 20 nm, 30 nm, 40 nm, 50 nm, 60 nm, 70 nm, 80 nm, 90 nm, 100 nm, or more.

In some embodiments, position camera 222 includes one or more still cameras, one or more video cameras, other devices for capturing images, one or more spectrometers, one or more spectrographs, other devices for probing intensity of light as a function of the electromagnetic spectrum, or some combination thereof. In some embodiments, position camera 222 generates calibration data that includes one or more images showing observed positions of locators 262 that are detected by position camera 222 (e.g., still cameras or video cameras).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

In some embodiments, input interface 240 includes one or more controllers 260. In FIG. 2A, input interface 240 includes controller 260-1 and controller 260-2. In some embodiments, a respective controller 260 (e.g., controller 260-1 or 260-2) includes one or more of the components described above with respect to display device 205 (e.g., controller 260-1 includes one or more locators 262 and/or one or more position sensors 225). In some embodiments, the respective controller 260 includes locators 262, which correspond to locators 220 of display device 205, for tracking the movement of the respective controller 260. In some embodiments, the respective controller 260 also includes control inputs 266. In some embodiments, control inputs 266 include one or more of buttons, triggers, touch screens, control sticks and so forth for receiving inputs from a user. In some embodiments, the respective controller 260 includes additional components not shown in FIG. 2A.

Console 210 provides media to display device 205 for presentation to the user in accordance with information received from one or more of: optical sensors 235, display device 205, and input interface 240 (e.g., controller 260-1 and/or controller 260-2). In the example shown in FIG. 2A, console 210 includes application store 245, tracking module 250, application engine 255, one or more processor 212 and memory 214. Some embodiments of console 210 have different modules than those described in conjunction with FIG. 2A. In some embodiments, console 210 additionally includes modules of display device 205, or a subset or a superset thereof (e.g., console 210 includes processor 212, memory 214, and electronic display 215). Similarly, the functions further described below may be distributed among components of console 210 in a different manner than is described here.

One or more processors 212 (e.g., processing units or cores) execute instructions stored in memory 214. Memory 214 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 214, or alternately the non-volatile memory device(s) within memory 214, includes a non-transitory computer readable storage medium. In some embodiments, memory 214 or the computer readable storage medium of memory 214 stores the following programs, modules and data structures, or a subset or superset thereof:

- instructions for causing locators 220 and/or 262 to emit light;
- instructions for causing optical sensors 235 to receive light; and
- instructions for processing electrical signals from optical sensors 235 to determine a position of display device 205, controller 260-1, and/or controller 260-2.

In some embodiments, the above programs, modules and data structures, or a subset or superset thereof are stored in memory 228 or the computer readable storage medium of memory 228 of display device 205.

When application store 245 is included in console 210, application store 245 stores one or more applications for execution by console 210. An application is a group of instructions, that when executed by a processor, generates content for presentation to the user. Content generated by an application may be in response to inputs received from the user via movement of display device 205 or input interface 240. Examples of applications include: gaming applications, conferencing applications, video playback application, or other suitable applications.

In some embodiments, when tracking module 250 is included in console 210, tracking module 250 calibrates system 200 using one or more calibration parameters and may adjust one or more calibration parameters to reduce error in determination of the position of display device 205. For example, tracking module 250 adjusts the focus of optical sensors 235 to obtain a more accurate position for observed locators on display device 205 and/or controllers 260-1 and 260-2. Moreover, calibration performed by tracking module 250 also accounts for information received from IMU 230. Additionally, if tracking of display device 205 is lost (e.g., optical sensors 235 lose line of sight of at least a threshold number of locators 220), tracking module 250 re-calibrates some or all of system 200.

In some embodiments, tracking module 250 tracks movements of display device 205 using calibration information from optical sensors 235 (also called herein second calibration information). For example, tracking module 250 determines positions of a reference point of display device 205 using observed locators from the second calibration information and a model of display device 205. In some embodiments, tracking module 250 also determines positions of a reference point of display device 205 using position information from the first calibration information. Additionally, in some embodiments, tracking module 250 may use portions of the first calibration information, the second calibration information, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205, controller 260-1, and/or controller 260-2 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 (e.g., controllers 260-1 and 260-2) and provides feedback to the user that the action was performed. The provided feedback may be visual or audible feedback via display device 205 or haptic feedback via input interface 240.

In some embodiments, interactive display device 200 includes display device 205 and console 210. In some embodiments, interactive display device 200 further includes controller 260-1 and/or controller 260-2.

In some embodiments, console 210 includes a communication device that is used for connecting console 210 with other devices (e.g., display device 205 and/or controller 260, such as controller 260-1 and controller 260-2). In some embodiments, display device 205 includes a communication device that is used for connecting display device 205 with other devices (e.g., console 210 and/or controller 260, such as controller 260-1 and controller 260-2). In some embodiments, controller 260 (e.g., controller 260-1 or controller 260-2) includes a communication device that is used for connecting controller 260 with other devices (e.g., console 210 and/or display device 205). The communication device operates based on one or more communication protocols (e.g., TCP/IP, IEEE 802.11, WiMAX, Bluetooth, BLE, Z-Wave, Zigbee, 6LoWPAN, WiGig, WirelessHD, CDMA, TDMA, GSM, LTE, etc).

Figure 2B:
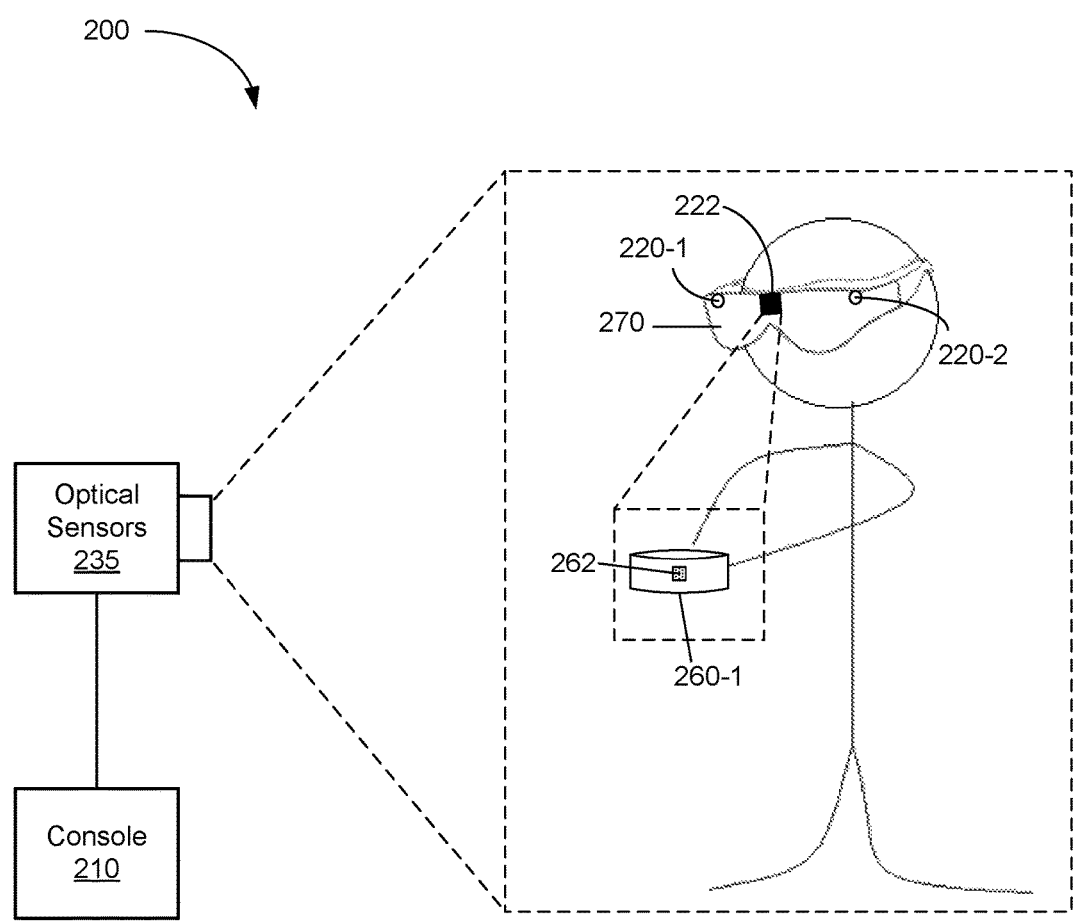
FIG. 2B is schematic diagram illustrating a system including a display device in accordance with some embodiments.

FIG. 2B shows a schematic illustration of system 200, in accordance with some embodiments. In FIG. 2B, display device 270 is a head-mounted display, corresponding to display device 100 of FIG. 1 or display device 205 of FIG. 2B. Display device 270 has locators 220-1 and 220-2 and position camera 222. Controller 260-1 has locator 262. Position camera 222 can detect light emitted by locator 262 and track the movement of controller 260-1 relative to display device 270. In some embodiments, position camera 222 is configured so that controller 260-1 remains within a field of view of position camera 222 while position camera 222 is worn by a user and controller 260-1 is held by the user during the operation of display device 270. In some embodiments, display device 270 and controller 260-1 remain within a field of view of optical sensors 235 during the operation of display device 270. Optical sensors 235 can detect light emitted by locators 220-1, 220-2 and 262, and track the movement of display device 270 and controller 260-1 (caused by the user movement).

Figure 3A:
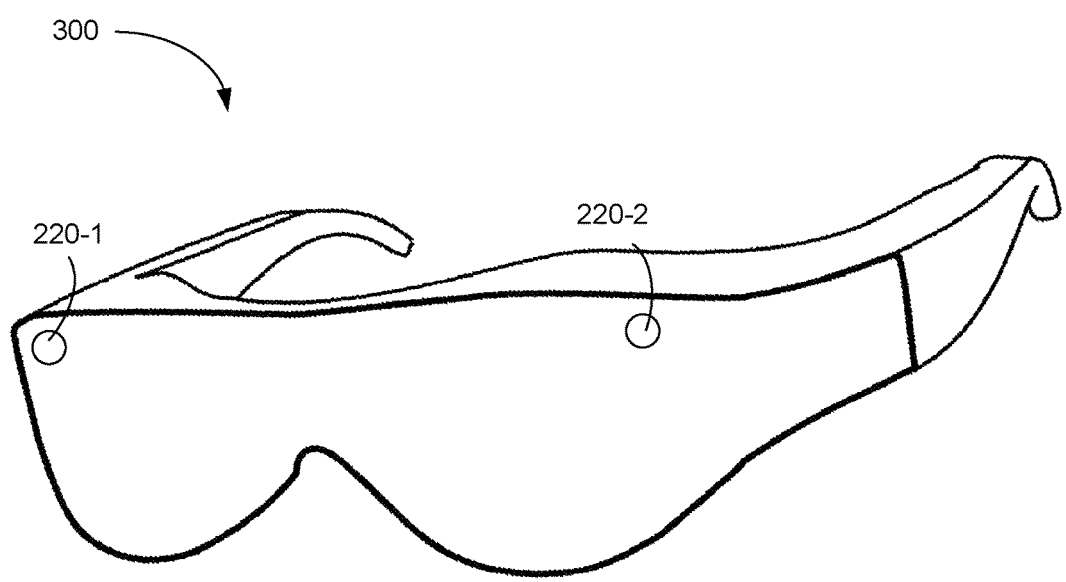
FIG. 3A is a perspective view of a schematic diagram illustrating a display device with locators in accordance with some embodiments.
Figure 3B:
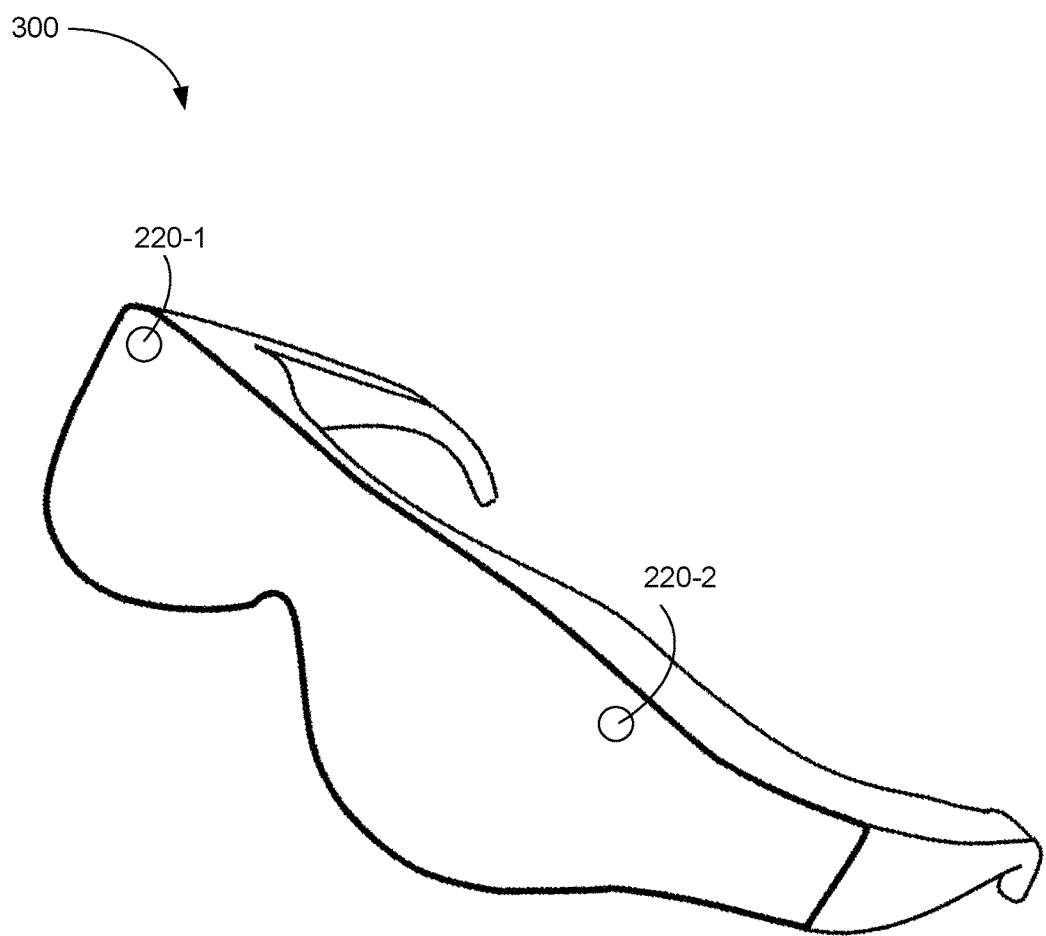
FIG. 3B is a perspective view of a schematic diagram illustrating a display device with locators in accordance with some embodiments.
Figure 3C:
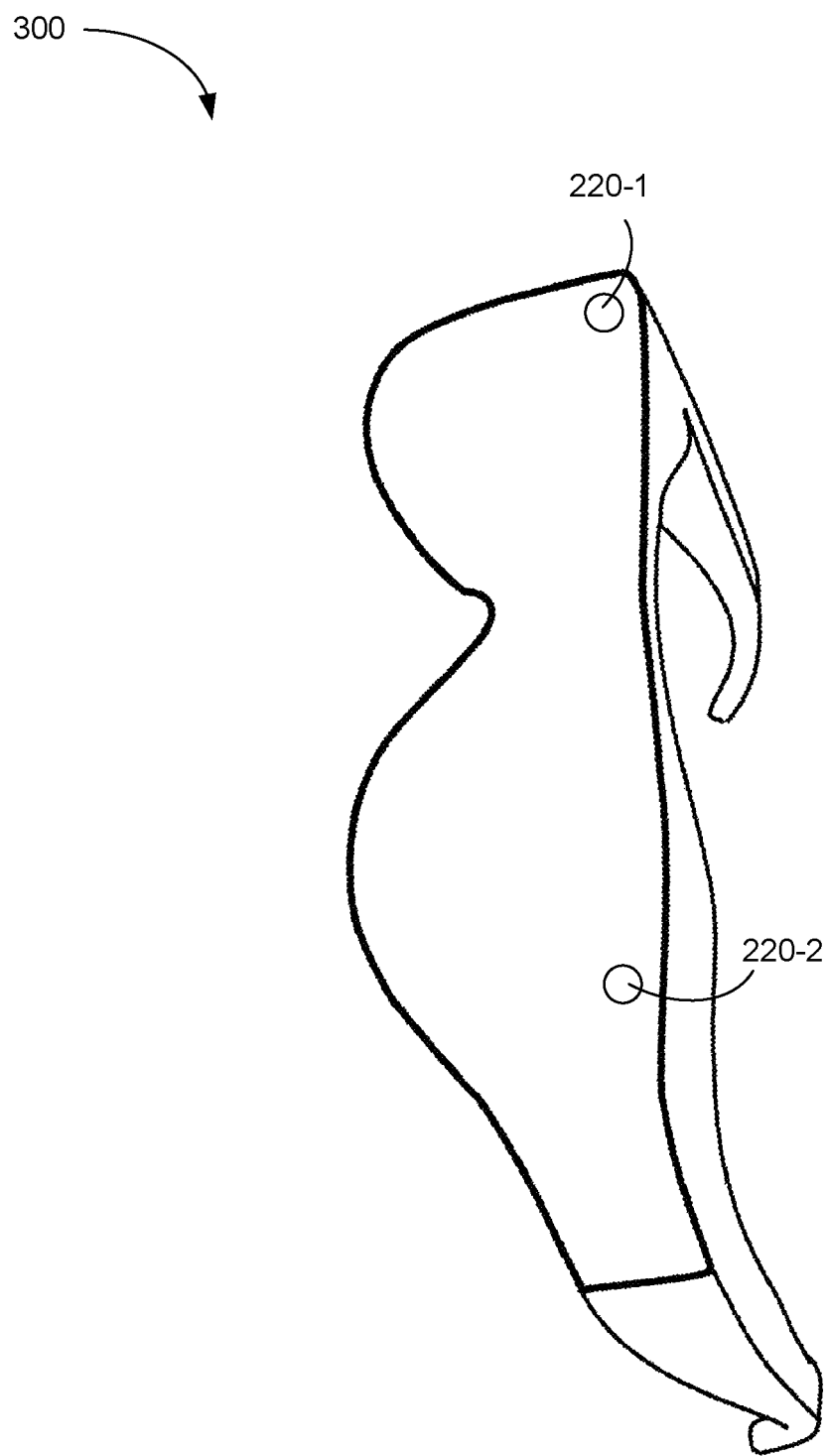
FIG. 3C is a perspective view of a schematic diagram illustrating a display device with locators in accordance with some embodiments.

FIGS. 3A-3C are perspective views of a display device with locators in accordance with some embodiments.

FIG. 3A illustrates display device 300, which corresponds to display device 100 shown in FIG. 1, except that FIG. 3A shows locators 220-1 and 220-2 (e.g., light sources) on display device 300. Locators 220-1 and 220-2 correspond to locator 220 of FIG. 2A. Locators 220-1 and 220-2 emit light of a same shape (e.g., beams of light from locators 220-1 and 220-2 have the same shape). Locators 220-1 and 220-2 may have different shapes (e.g., circular, square, rectangular, elliptical, triangular, polygonal, etc.). In some embodiments, locator 220-1 has a different shape than locator 220-2.

Locators 220-1 and 220-2 can each emit light having one or more distinct wavelengths. In some embodiment, locators 220-1 and 220-2 emit light having one distinct wavelength. In some embodiment, locators 220-1 and 220-2 emit light of the same distinct wavelength (e.g., light output by locator 220-1 and light output by locator 220-2 have approximately a same peak wavelength and a same bandwidth, and thus, they are perceived as having a same color). In some embodiments, locators 220-1 and 220-2 emit light having different distinct wavelengths. In some embodiments, locators 220-1 and 220-2 emit light having two or more distinct wavelengths. In some embodiments, the set of two or more distinct wavelengths emitted by locator 220-1 is the same, partially different (e.g., locator 220-1 emits light at blue and red wavelength and locator 220-2 emits light at red and green wavelength) or fully different than the set of two or more distinct wavelengths submitted by locator 220-2.

As explained above with respect to FIG. 2A, an image of locators 220-1 and 220-2 collected by optical sensors 235 is used to determine a position (e.g., a lateral position and/or an angular position) of display device 300.

For example, in some embodiments, when an image of display device 300 shows that a height of locator 220-1 and a height of locator 220-2 are similar (e.g., locator 220-1 and locator 220-2 are located at similar vertical levels within the image), display device 300 is deemed to be in a horizontal position. In some embodiments, multiple images of display device 300, taken by two or more cameras that are spaced apart, are used to determine the height of locator 220-1 and the height of locator 220-2 (e.g., using triangulation).

FIG. 3B illustrates that display device 300 has rotated. In some embodiments, when an image of display device 300 shows that a height of locator 220-1 is different from a higher of locator 220-2, display device 300 is deemed to be in a tilted position. In some cases, an angle of the tilting can be determined based on the height of locator 220-1 and the height of locator 220-2.

FIG. 3C illustrates display device 300 rotated by approximately 90 degrees toward left. Based on the heights of locators 220-1 and 220-2 in an image of display device 300, it can be determined that display device 300 is in a tilted position.

Figure 3D:
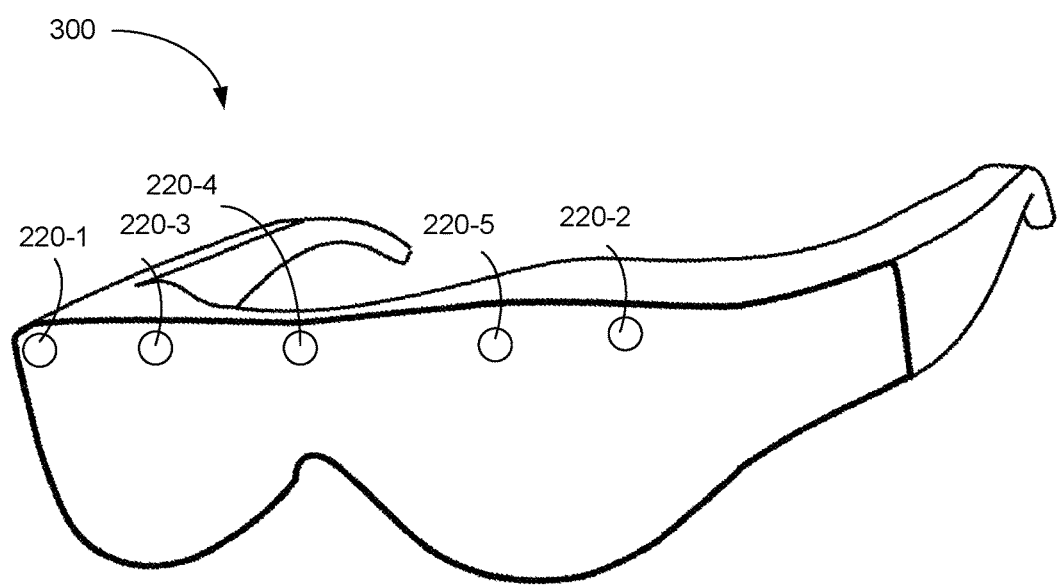
FIG. 3D is a perspective view of a schematic diagram illustrating a display device with locators in accordance with some embodiments.

FIG. 3D illustrates display device 300 with five locators 220-1, 220-2, 220-3, 220-4 and 220-5 positioned in an array on display device 300. Alternatively, locators 220-1, 220-2, 220-3, 220-4 and 220-5 can be positioned in any orientation or on any surface of display device 300. In some embodiments, as described in relation to locators 220-1 and 220-2, each of locators 220-1, 220-2, 220-3, 220-4 and 220-5 is configured to emit one or more distinct wavelengths of light where the sets of colors emitted by the different locators can be the same, different or partially different.

Figure 4:
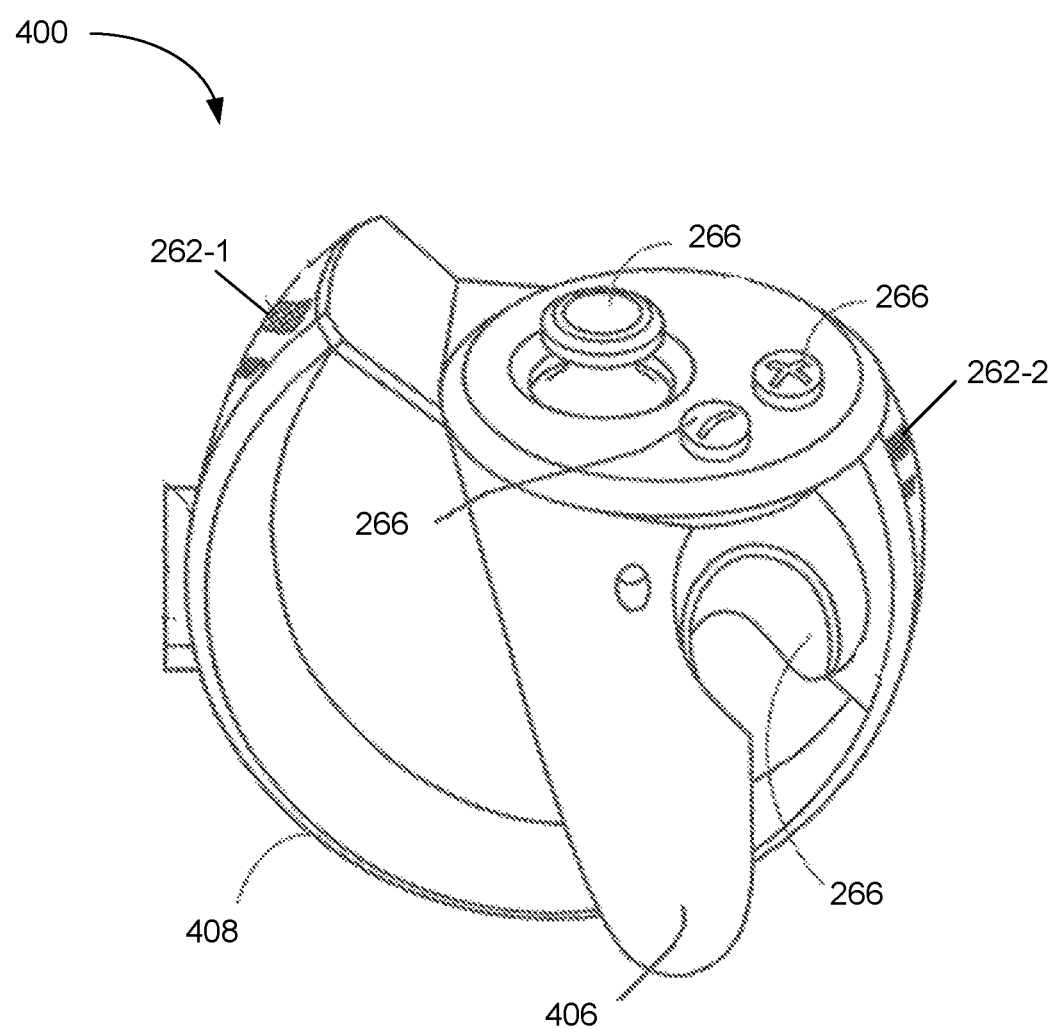
FIG. 4 is a schematic diagram illustrating a controller in accordance with some embodiments.

FIG. 4 is a schematic illustrating controller 400, which corresponds to controllers 260-1 and 260-2 of FIG. 2A. Controller 400 includes one or more input devices 266, holder 406, frame 408, or any superset or subset thereof. User provides commands to console 220 with input devices 266, which include one or more of buttons, triggers, touch screens, and/or control sticks.

In FIG. 4, controller 400 includes locators 262-1 and 262-2. Optionally, locators 262-1 and 262-2 are located on opposite sides of controller 400. When a user moves controller 400, the movement of controller 400 is detected by one or more optical sensors 235 and/or position camera 222, as described in relation to FIGS. 2A-2B. In some embodiments, controller 400 also includes one or more position sensors (e.g., one or more accelerometers, one or more gyroscopes, one or more magnetometers, another suitable type of sensor that detects motion), and information from the one or more position sensors is used in conjunction with the information from optical sensors and/or information from position camera 222. When system 200 of FIG. 2A includes two or more controllers (e.g., controller 260-1 and controller 260-2), having the controllers emit distinct wavelengths facilitates distinguishing the controllers in images collected by optical sensors 235 or position camera 222.

Figure 5A:
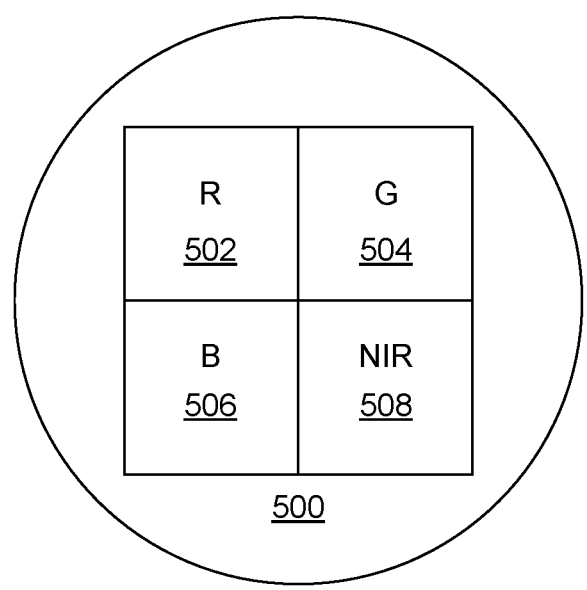
FIG. 5A is a schematic diagram illustrating a locator in accordance with some embodiments.

FIG. 5A illustrates locator 500, which corresponds to locators 220 and locators 262 of FIG. 2A, with a plurality of light sources (e.g., light emitting diodes (LEDs)) positioned thereon. In some embodiments, respective light sources emit light having distinct wavelengths. For example, the light sources have distinct peak wavelengths. The light emitted by the plurality of light sources can have a same bandwidth (e.g., a first light source emits light having 100 nm bandwidth at 500 nm and a second light source emits light having 100 nm bandwidth at 700 nm) or different bandwidths (e.g., a first light source emits light having 50 nm bandwidth at 500 nm and a second light source emits light having 100 nm bandwidth at 700 nm). As an example, FIG. 5A shows red (R) light source 502, green (G) light source 504, blue (B) light source 506 and near-infrared (NIR) light source 508, but each light source can emit light of any other wavelength. In some embodiments, the bandwidth (full-width half maximum (FWHM)) of the light emitted by light sources 502, 504, 406 and 508 range from about 10 nm to about 50 nm (e.g., about 10, 15, 20, 25, 30, 35, 40, 45 or about 50 nm).

In some embodiments, locator 500 emits light by two or more (e.g., two, three or four) light sources 502, 504, 406 and 508 concurrently. In some embodiments, locator 500 emits light by two or more (e.g., two, three or four) light sources 502, 504, 406 and 508 concurrently in accordance with instructions provided by console 210. In some embodiments, locator 500 emits a combination of two colors (e.g., red 502 and green 504, red 502 and blue 506, red 502 and NIR 508, green 504 and blue 506, green 504 and NIR 508, blue 506 and NIR 508), three colors (e.g., red 502, green 504 and blue 506), or four colors (e.g., red 502, green 504, blue 506 and NIR 508). In some embodiments, the emitted lights have the same intensity. In some embodiments, the emitted lights have different intensities. As used herein, the term "light intensity" refers to a wavelength-weighted power emitted by a light source.

Figure 5B:
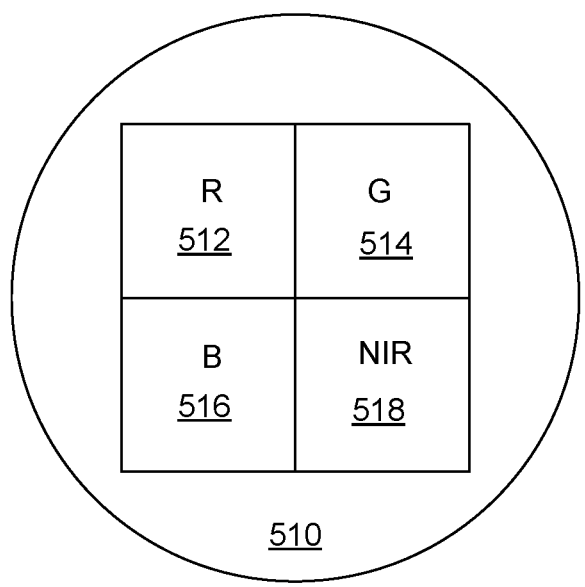
FIG. 5B is a schematic diagram illustrating a side view and a front view of a locator in accordance with some embodiments.
Figure 5B:
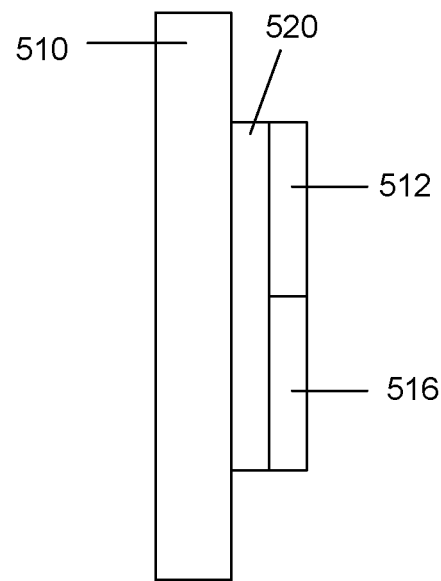

FIG. 5B illustrates a top view and a side view of locator 510, which corresponds to locator 220 and locator 262. Locator 510 is similar to locator 500 shown in FIG. 5A, except that the light source is broadband light source 520 (e.g., a white light source) and a plurality of filters are used to emit light of distinct wavelengths. As an example, locator 510 includes four color filters (e.g., bandpass filters) that allow light having distinct wavelength to pass through: red color filter 512, green color filter 514, blue color filter 516 and NIR color filter 518 positioned in front of broadband light source 420.

Although FIGS. 5A and 5B illustrate embodiments with blue, green, red and NIR light, any color (or any color combination) can be used. In some embodiments, the bandwidth (full-width half maximum (FWHM)) of the light passing through color filters 512-518 ranges from about 1 nm to about 50 nm (e.g., FWHM is about 1, 5, 10, 15, 20, 25, 30, 35, 40, 45 or about 50 nm). Additionally, locator 510 optionally includes shutters for conditionally blocking illumination through one or more filters (e.g., only a shutter for red color filter 512 is opened to allow light to pass through red color filter 512 at a particular time, and only a shutter for green filter 514 is opened to allow light to pass through green color 514 at a different time). In some embodiments, in accordance to instructions received from console 210, broadband light source 520 illuminates light through one or more selected color filters 512, 514, 516, and 518 (e.g., broadband light source 520 is segmented and each segment is configured for independent activation based on instructions from console 210). Accordingly, illumination through unselected color filters is blocked, prevented, or reduced. In some embodiments, locator 510 emits light through two or more color filters simultaneously.

Is some embodiments, locators (e.g., locators 500 and 510) optionally include other optical components, such as additional filters, diffractive optical elements and/or lenses (e.g., a spherical lens, a cylindrical lens, a Fresnel lens, etc.), for changing the properties of a beam passing therethrough. For example, such components can be used for changing the shape of the beam, or intensity of the beam passing therethrough.

Each of locators 220 and locators 262 of system 200 of FIG. 2A is configured to emit a set of one or more distinct wavelengths. In some embodiments, optical sensors 235 identify the colors and/or intensities of light emitted by locators 220 and locators 262. The sets of one or more distinct wavelengths can be used to distinguish display device 205 from controllers 260-1 and 260-2. For example, display device 300 of FIGS. 3A-3C is identified by a first set of one or more distinct wavelengths, locator 220-1 is identified by a second set of one or more distinct wavelengths that is distinct from the first set of one or more distinct wavelengths, and locator 220-2 is identified by a third set of one or more distinct wavelengths that is distinct from the first set of one or more distinct wavelengths and the second set of one or more distinct wavelengths. The first set of one or more distinct wavelengths and the second set of one or more distinct wavelengths are different in terms of color and/or intensity of light emitted. For example, locator 220-1 emits red and blue light and locator 220-1 emits red and green light. Similarly, the second set of one or more distinct wavelengths and the third set of one or more distinct wavelengths are different in terms of color and/or intensity of light emitted; and the first set of one or more distinct wavelengths and the third set of one or more distinct wavelengths are different in terms of color and/or intensity of light emitted. The selection of unique sets of one or more distinct wavelengths can also be applied for distinguishing controller 260-1 from controller 260-2.

In some embodiments, the first, second, and third sets of one or more distinct wavelengths are selected to distinguish light emitted by devices other than display device 205, controller 260-1 and controller 260-2. In some embodiments, the first, second, and third sets of one or more distinct wavelengths are selected to distinguish ambient light, such as sun light and/or indoor lighting.

FIGS. 6A-6D illustrate prophetic examples of selection of colors for motion tracking.

Figure 6A:
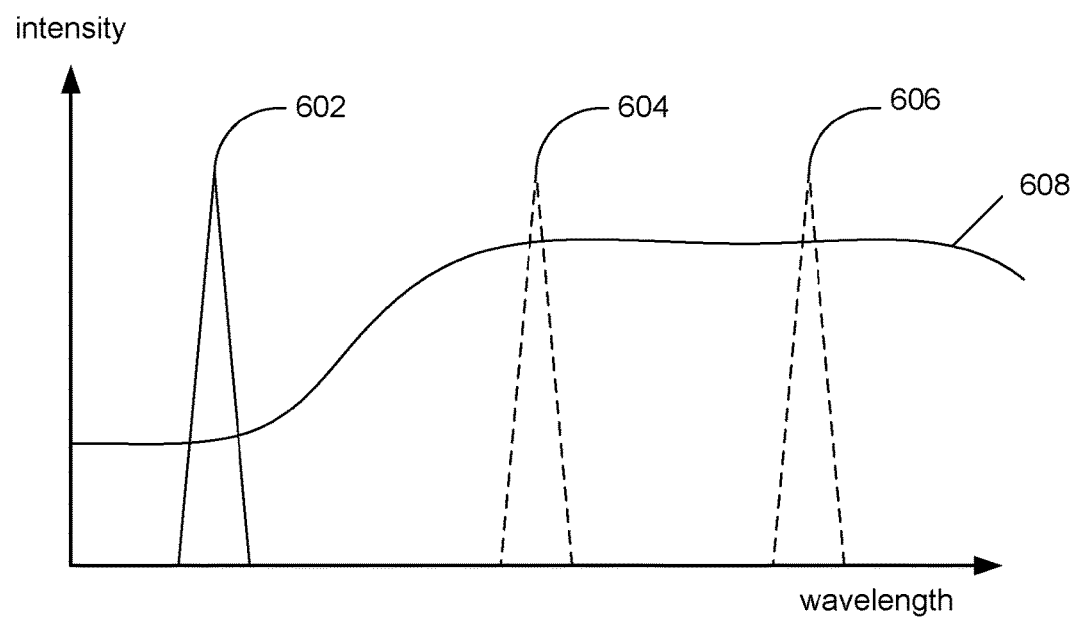
FIG. 6A illustrates selection of a set of one or more distinct wavelengths for emission by a respective locator.

FIG. 6A illustrates a prophetic example of selecting a set of one or more distinct wavelengths for emission by a respective locator. The respective locator is configured to emit any combination of emission bands 602, 604 and 606 (e.g., the respective locator includes a blue LED configured to emit light having emission band 602, corresponding to a blue light, a green LED configured to emit light having emission band 604, corresponding to a green light, and a red LED configured to emit light having emission band 606, corresponding to a red light), as described above with respect to FIGS. 4A and 4B. Spectrum 608 represents the intensity of ambient light detected by one or more optical sensors 235 (e.g., by a spectrometer). In FIG. 6A, ambient light has a lower intensity for the wavelength range that corresponds to emission band 602 than for the wavelength range that corresponds to emission band 604 or emission band 606, and a wavelength that corresponds to emission band 602 is selected for emission by the respective locator.

Figure 6B:
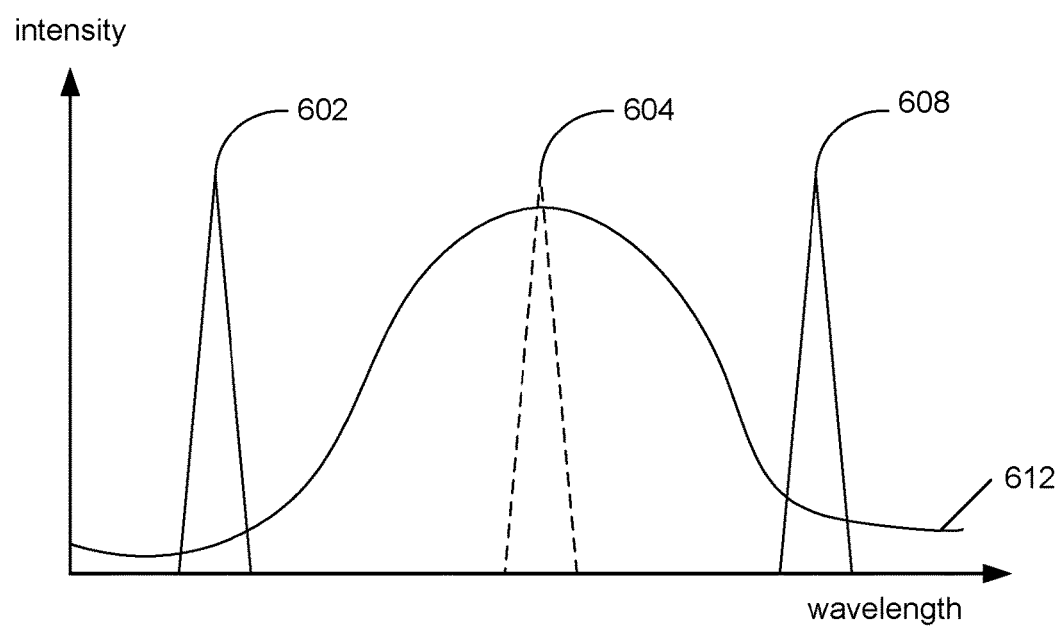
FIG. 6B illustrates selection of a set of one or more distinct wavelengths for emission by a respective locator.

FIG. 6B illustrates a second prophetic example of selecting a set of one or more distinct wavelengths for emission by a respective locator. In FIG. 6B, spectrum 612 representing the intensity of ambient light has a high intensity for emission band 604 and a low intensity for emission bands 602 and 608. A wavelength that corresponds to emission band 602 and a wavelength that corresponds to emission band 608 are selected for emission by the respective locator.

Figure 6C:
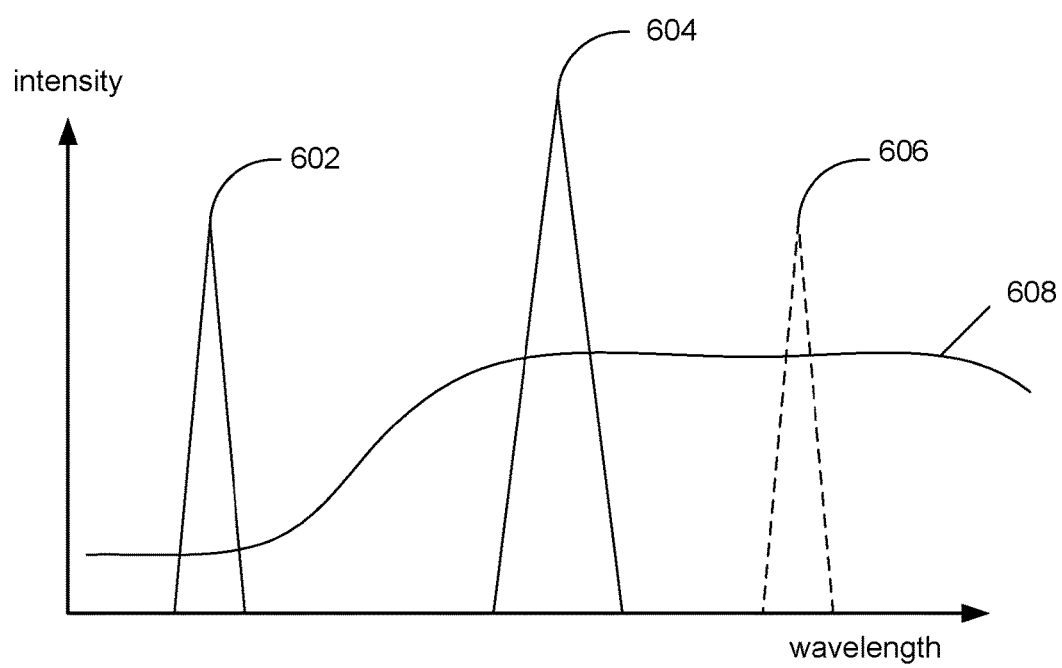
FIG. 6C illustrates selection of a set of one or more distinct wavelengths for emission by a respective locator.

FIG. 6C illustrates a third prophetic example of selecting a set of one or more distinct wavelengths for emission by a respective locator. In FIG. 6C, spectrum 608 representing the ambient light has a low intensity for emission band 602, and high intensity for emission bands 604 and 608. Thus, a wavelength that corresponds to emission band 602 is selected for emission by the respective locator, as described above with respect to FIG. 6A. When the intensities of light emitted by the respective locator can be adjusted (e.g., based on instructions received from console 220), the intensity of light for an emission band with a high intensity background light (e.g., emission band 604) can be increased to improve distinction over the background light. In FIG. 6C, a wavelength corresponding to emission band 604 is selected and the intensity of light for emission band 604 is increased (e.g., the intensity of light for emission band 604 is higher than the intensity of light for emission band 602).

In addition to, or instead of, selecting a set of one or more distinct wavelengths based on an intensity of light detected by one or more optical sensors, additional information (e.g., wavelengths already selected for other devices of system 200) can be used for selecting the set of one or more distinct wavelengths for emission by a respective locator.

FIG. 6D illustrates a prophetic example of selecting a set of one or more distinct wavelengths for emission by a respective locator. The table shown in FIG. 6D is for a system with display device 205 and two controllers 260-1 and 260-2. When controller 260-1 is configured to emit red light and controller 260-2 is configured to emit blue light, green light, NIR light, or a combination of green and NIR light is selected (e.g., by console 210) for emission by display device 205 (or one or more locators of display device 205).

In some embodiments, after green light is selected for emission by display device 205, an increased intensity of a green light component in the ambient light is detected, a different wavelength (e.g., NIR light) is subsequently selected for emission by display device 205.

In some embodiments, after green light and NIR light are selected for emission by display device 205, an increased intensity of a green light component in the ambient light is detected, and green light is deselected for emission by display device 205 (e.g., display device 205 is configured to emit NIR light but not green light).

In some embodiments, when, after red light is selected for emission by controller 260-1, blue light is selected for emission by controller 260-2, and green light is selected for emission by display device 205, a different wavelength needs to be selected for controller 260-1 (e.g., due to an increased intensity of a red light component in the ambient light), NIR light is selected for emission by controller 260-1 (so as not to interfere with the blue light emitted by controller 260-2, the green light emitted by display device 205, and the ambient red light).

Therefore, by using light sources (e.g., locators 220 and locators 262) that can emit light of a selected set of one or more distinct wavelengths, a position of devices can be accurately determined from one or more images of the devices. The one or more distinct wavelengths are selected to reduce interference with ambient light, light emitted by other devices of the system, and any device other than the devices of the system. In addition, the images of the devices can be used in conjunction with other position information (e.g., measurements from inertial sensors, etc.) to further improve the speed and/or accuracy in determining the position of the devices.

Certain embodiments based on these principles are described below.

In accordance with some embodiments, an electronic device is in communication with a first portable device and one or more optical sensors. In some embodiments, the electronic device is a computing device and the first portable device is a head-mounted display (e.g., console 210 in communication with display device 205 and one or more optical sensors 235). In some embodiments, the electronic device is the computing device and the first portable device is a controller. In some embodiments, the electronic device is the head-mounted display and the first portable device is a controller.

The electronic device includes one or more processors, and memory storing one or more programs (e.g., in FIG. 2A, console 210 includes one or more processor(s) 212 and memory 214). The one or more programs include instructions, which, when executed by the processor, cause the electronic device to perform the following operations.

The electronic device selects a first set of one or more distinct wavelengths for tracking the first portable device (e.g., FIGS. 6A-6D). Subsequent to selecting the first set of one or more distinct wavelengths for tracking the first portable device, the electronic device initiates the first portable device to emit light of the first set of one or more selected wavelengths (e.g., the electronic device, such as console 210, sends signals or instructions to the first portable device to emit light of the first set of one or more selected wavelengths). The electronic device receives information identifying one or more respective intensities of light, detected by the one or more optical sensors, for the first set of one or more selected wavelengths (e.g., the electronic device, such as console 210, receives an image that includes information identifying one or more respective intensities of light for the light emitted by locators 220 of display device 205 over an area). A position of the first portable device is determined based on the information identifying the one or more respective intensities of light, detected by the one or more optical sensors, for the first set of one or more selected wavelengths (e.g., when the first portable device emits red light, an image or an intensity map for the red light is used to determine the location of the first potable device).

In some embodiments, the electronic device receives information identifying respective intensities of light, detected by the one or more optical sensors, for a plurality of distinct wavelengths (e.g., the electronic device receives intensity information for two or more distinct wavelengths, such as a blue wavelength and a red wavelength). The first set of one or more distinct wavelengths for tracking the first portable device is selected based on the respective intensities of light, detected by the one or more optical sensors, for the plurality of distinct wavelengths (e.g., as described with respect to FIGS. 6A-6D, the first set of one or more distinct wavelengths is selected based on the intensity of ambient light or light from other devices for respective color components).

In some embodiments, the light for the plurality of distinct wavelengths is detected by the one or more optical sensors while the first portable device is not emitting light of the first set of one or more selected wavelengths (e.g., in FIG. 6A, spectrum 608 represents the intensity of ambient light at a wavelength range measured by one or more optical sensors 235, such as spectrometer, while display device 205 is not emit light by locators 220). This allows the one or more optical sensors to detect an ambient light or light from devices other than the first portable device, which is deemed to be a background light.

In some embodiments, the first set of one or more distinct wavelengths is selected based on at least one or more wavelengths of light selected for emission by one or more portable devices, other than the first portable device, that are in communication with the electronic device. For example, FIG. 6D illustrates selection of a set of one or more distinct wavelengths for display device 205 based on lights emitted by controllers 260-1 and 260-2. Similarly, one or more distinct wavelengths can be selected for controller 260-1 based on lights emitted by display device 205 and controller 260-2.

In some embodiments, the first set of one or more distinct wavelengths includes two or more distinct wavelengths (e.g., FIG. 6C illustrates selection of a set of two or more distinct wavelengths for display device 205). Subsequent to selecting the two or more distinct wavelengths, the electronic device selects respective intensities for the two or more distinct wavelengths (e.g., FIG. 6C illustrates selection of the respective intensities for the two or more distinct wavelengths). The electronic device initiates the first portable device to emit light of the two or more selected wavelengths in accordance with the selected respective intensities of light. The electronic device receives information identifying respective intensities of light for the two or more distinct wavelengths, detected by the one or more optical sensor, and based on this information, the position of the first portable device is determined. For example, when the electronic device initiates the first portable device to emit a first light of a first wavelength with a first intensity and a second light of a second wavelength, distinct from the first wavelength, with a second intensity that is distinct from the first intensity, the electronic device determines whether a ratio of the intensity of light, detected by the one or more optical sensors for a particular location, for the first wavelength and the intensity of light for the second wavelength, detected by the one or more optical sensors for the particular location, corresponds to a ratio of the first intensity and the second intensity. In some embodiments, when the ratio of the intensity of the green light, detected by the one or more optical sensors for the particular location, to the intensity of the red light, detected by the one or more optical sensors for the particular location, does not correspond to the ratio of the first intensity to the second intensity, the red light and the green light, detected by the one or more optical sensors for the particular location, are ignored in determining the position of the first portable device. In some embodiments, when the ratio of the intensity of the green light, detected by the one or more optical sensors for the particular location, to the intensity of the red light, detected by the one or more optical sensors for the particular location, corresponds to the ratio of the first intensity to the second intensity, the red light and the green light, detected by the one or more optical sensors for the particular location, are used for determining the position of the first portable device (e.g., the particular location is deemed to be the position of the first portable device). In some embodiments, the electronic device selects respective intensities of light for the two or more distinct wavelengths in conjunction with selecting the first set of one or more distinct wavelengths for tracking the first portable device (e.g., the electronic device concurrently selects the two or more distinct wavelengths and the respective intensities of light for the two or more distinct wavelengths).

In some embodiments, the electronic device selects a second set of one or more distinct wavelengths for tracking a second portable device that is in communication with the electronic device (e.g., a second set of one or more distinct wavelength is selected for controller 260-1). Subsequent to selecting the second set of one or more distinct wavelengths for tracking the second portable device, the electronic device initiate the second portable device to emit light of the second set of one or more selected wavelengths (e.g., a red light as shown in FIG. 6D). The electronic device receives information identifying one or more respective intensities of light, detected by the one or more optical sensors, for the second set of one or more selected wavelengths and based on that information, and determines a position of the second portable device based on the information identifying the one or more respective intensities of light, detected by the one or more optical sensors, for the second set of one or more selected wavelengths.

In some embodiments, the electronic device also initiates the second portable device to emit light of the second set of one or more selected wavelengths while the first portable device is emitting light of the first set of one or more selected wavelengths (e.g., display device 205 and controller 260-1 emit lights concurrently, according to instructions by console 210).

In some embodiments, the electronic device also selects a third set of one or more distinct wavelengths for tracking a third portable device that is in communication with the electronic device (e.g., at third set of one or more distinct wavelength is selected for controller 260-2). Subsequent to selecting the third set of one or more distinct wavelengths for tracking the third portable device, the electronic device initiates the third portable device to emit light of the third set of one or more selected wavelengths (e.g., a blue light as shown in FIG. 6D). The electronic device receives information identifying one or more respective intensities of light, detected by the one or more optical sensors, for the third set of one or more selected wavelengths, and determine a position of the third portable device based on the information identifying the one or more respective intensities of light, detected by the one or more optical sensors, for the third set of one or more selected wavelengths.

In accordance with some embodiments, an interactive display device includes an electronic device described herein and the first portable device that is distinct and separate from the electronic device. For example, the interactive display device includes console 210 and display device 205. In another example, the interactive display includes display device 205 and controller 260-1.

In some embodiments, the display device is a head-mounted display device (e.g., display device 100 of FIG. 1).

In some embodiments, the interactive display device further includes a second portable device that is distinct from the electronic device and the first portable device (e.g., controller 400 of FIG. 4).

In some embodiments, the second portable device includes a plurality of light sources each configured to emit light of a respective wavelength selected from a plurality of distinct wavelengths. The light sources include a first light source configured to emit light of a first wavelength selected from the plurality of distinct wavelengths and a second light source, distinct from the first light source, configured to concurrently emit light of a second wavelength, distinct from the first wavelength, selected from the plurality of distinct wavelengths. For example, in FIG. 5A, locator 500 includes a first light source (e.g., a first light-emitting device) for generating a first light (e.g., a red light) and a second light source (e.g., a second light-emitting device) for generating emit a second light that is distinct from the first light (e.g., a green light).

In some embodiments, the second portable device includes a plurality of light sources each configured to emit light of one or more wavelengths selected from a plurality of distinct wavelengths. The light sources include a first light source configured to concurrently emit light of one or more wavelengths selected from the plurality of distinct wavelengths and a second light source, distinct from the first light source, configured to concurrently emit light of one or more wavelengths selected from the plurality of distinct wavelengths. For example, in FIG. 5A, locator 500 includes a first light source (e.g., a first light-emitting device) for generating a first light (e.g., a red light) and a second light source (e.g., a second light-emitting device) for generating emit a second light that is distinct from the first light (e.g., a green light).

In accordance with some embodiments, a method is performed by an electronic device which is in communication with a first portable device and one or more optical sensors. The method includes selecting a first set of one or more distinct wavelengths for tracking the first portable device; and, subsequent to selecting the first set of one or more distinct wavelengths for tracking the first portable device, initiating the first portable device to emit light of the first set of one or more selected wavelengths.

In some embodiments, the method includes providing instructions to the one or more optical sensors to send information identifying one or more intensities of light for the first set of one or more selected wavelengths. In some embodiments, the one or more optical sensors include one or more optical filters, and the instructions include instructions for activating a subset of the one or more optical filters. In some embodiments, the one or more optical sensors include a spectrometer, and the instructions include instructions for converting one or more intensities of light only for the first set of one or more selected wavelengths into electric signals.

In some embodiments, the first portable device includes a plurality of light sources, each configured to emit light of a distinct wavelength. The method includes selecting a first set of one or more light sources of the plurality of light sources for tracking the first portable device; and, subsequent to selecting the first set of one or more light sources for tracking the first portable device, initiating the first portable device to emit light using the first set of one or more light sources.

The method also includes receiving information identifying one or more respective intensities of light, detected by the one or more optical sensors, for the first set of one or more selected wavelengths.

In some embodiments, the method includes receiving information identifying one or more respective intensities of light, detected by the one or more optical sensors, for only the first set of one or more selected wavelengths (e.g., the method includes foregoing receiving information identifying an intensity of light for a wavelength other than the first set of one or more selected wavelengths).

The method further includes determining a position of the first portable device based on the information identifying the one or more respective intensities of light, detected by the one or more optical sensors, for the first set of one or more selected wavelengths.

In some embodiments, the method includes receiving information identifying respective intensities of light, detected by the one or more optical sensors, for a plurality of distinct wavelengths. The first set of one or more distinct wavelengths for tracking the first portable device is selected based on the respective intensities of light, detected by the one or more optical sensors, for the plurality of distinct wavelengths.

In some embodiments, the light for the plurality of distinct wavelengths is detected by the one or more optical sensors while the first portable device is not emitting light of the first set of one or more selected wavelengths.

In some embodiments, the first set of one or more distinct wavelengths is selected based on at least one or more wavelengths of light selected for emission by one or more portable devices, other than the first portable device, that are in communication with the electronic device.

In some embodiments, the first set of one or more distinct wavelengths includes two or more distinct wavelengths. The method includes, subsequent to selecting the first set of one or more distinct wavelengths for tracking the first portable device, selecting respective intensities of light for the two or more distinct wavelengths; initiating the first portable device to emit light of the two or more selected wavelengths in accordance with the selected respective intensities of light for the two or more distinct wavelengths; receiving information identifying respective intensities of light, detected by the one or more optical sensors, for the two or more distinct wavelengths; and determining the position of the first portable device based on the information identifying the respective intensities of light, detected by the one or more optical sensors, for the two or more distinct wavelengths.

In some embodiments, the method also includes selecting a second set of one or more distinct wavelengths for tracking a second portable device that is in communication with the electronic device; and, subsequent to selecting the second set of one or more distinct wavelengths for tracking the second portable device, initiating the second portable device to emit light of the second set of one or more selected wavelengths; receiving information identifying one or more respective intensities of light, detected by the one or more optical sensors, for the second set of one or more selected wavelengths; and determining a position of the second portable device based on the information identifying the one or more respective intensities of light, detected by the one or more optical sensors, for the second set of one or more selected wavelengths.

In some embodiments, the method includes initiating the second portable device to emit light of the second set of one or more selected wavelengths while the first portable device is emitting light of the first set of one or more selected wavelengths.

In some embodiments, the method includes selecting a third set of one or more distinct wavelengths for tracking a third portable device that is in communication with the electronic device; and, subsequent to selecting the third set of one or more distinct wavelengths for tracking the third portable device, initiating the third portable device to emit light of the third set of one or more selected wavelengths; receiving information identifying one or more respective intensities of light, detected by the one or more optical sensors, for the third set of one or more selected wavelengths; and determining a position of the third portable device based on the information identifying the one or more respective intensities of light, detected by the one or more optical sensors, for the third set of one or more selected wavelengths.

In accordance with some embodiments, a portable electronic device includes a light source configured to emit one or more wavelengths selected from a plurality of distinct wavelengths and a communication device for receiving information identifying one or more selected wavelengths. In some embodiments, the portable electronic device emits the one or more selected wavelengths based on the received information.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An electronic device in communication with a first portable device and one or more optical sensors, the electronic device comprising:
   one or more processors; and memory storing one or more programs, the one or more programs including instructions, which, when executed by the one or more processors, cause the electronic device to:
  receive information identifying respective intensities of light, detected by the one or more optical sensors, for a plurality of distinct wavelengths;
  select a first set of one or more distinct wavelengths for tracking the first portable device based on the respective intensities of light, detected by the one or more optical sensors, for the plurality of distinct wavelengths, wherein the first set of one or more distinct wavelengths is distinguishable from ambient light; and,
  subsequent to selecting the first set of one or more distinct wavelengths for tracking the first portable device:
    initiate the first portable device to emit light of the first set of one or more selected wavelengths;
    receive information identifying one or more respective intensities of light, detected by the one or more optical sensors, for the first set of one or more selected wavelengths; and
    determine a position of the first portable device based on the information identifying the one or more respective intensities of light, detected by the one or more optical sensors, for the first set of one or more selected wavelengths.

2. The electronic device of claim 1, wherein:
the light for the plurality of distinct wavelengths is detected by the one or more optical sensors while the first portable device is not emitting light of the first set of one or more selected wavelengths.

3. The electronic device of claim 1, wherein:
the first set of one or more distinct wavelengths is selected based on at least one or more wavelengths of light selected for emission by one or more portable devices, other than the first portable device, that are in communication with the electronic device.

4. The electronic device of claim 1, wherein:
the first set of one or more distinct wavelengths includes two or more distinct wavelengths; and
the one or more programs also include instructions, which, when executed by the one or more processors, cause the electronic device to, subsequent to selecting the first set of one or more distinct wavelengths for tracking the first portable device:
  select respective intensities of light for the two or more distinct wavelengths;
  initiate the first portable device to emit light of the two or more selected wavelengths in accordance with the selected respective intensities of light for the two or more distinct wavelengths;
  receive information identifying respective intensities of light, detected by the one or more optical sensors, for the two or more distinct wavelengths; and
  determine the position of the first portable device based on the information identifying the respective intensities of light, detected by the one or more optical sensors, for the two or more distinct wavelengths.

5. The electronic device of claim 1, wherein the one or more programs also include instructions, which, when executed by the one or more processors, cause the electronic device to:
  select a second set of one or more distinct wavelengths for tracking a second portable device that is in communication with the electronic device; and,
  subsequent to selecting the second set of one or more distinct wavelengths for tracking the second portable device:
    initiate the second portable device to emit light of the second set of one or more selected wavelengths;
    receive information identifying one or more respective intensities of light, detected by the one or more optical sensors, for the second set of one or more selected wavelengths; and
    determine a position of the second portable device based on the information identifying the one or more respective intensities of light, detected by the one or more optical sensors, for the second set of one or more selected wavelengths.

6. The electronic device of claim 5, wherein the one or more programs also include instructions, which, when executed by the one or more processors, cause the electronic device to:
  initiate the second portable device to emit light of the second set of one or more selected wavelengths while the first portable device is emitting light of the first set of one or more selected wavelengths.

7. The electronic device of claim 5, wherein the one or more programs also include instructions, which, when executed by the one or more processors, cause the electronic device to:
  select a third set of one or more distinct wavelengths for tracking a third portable device that is in communication with the electronic device; and,
  subsequent to selecting the third set of one or more distinct wavelengths for tracking the third portable device:
    initiate the third portable device to emit light of the third set of one or more selected wavelengths;
    receive information identifying one or more respective intensities of light, detected by the one or more optical sensors, for the third set of one or more selected wavelengths; and
    determine a position of the third portable device based on the information identifying the one or more respective intensities of light, detected by the one or more optical sensors, for the third set of one or more selected wavelengths.

8. An interactive display device, comprising:
the electronic device of claim 1; and
the first portable device that is distinct and separate from the electronic device.

9. The interactive display device of claim 8, wherein the first portable device is a head-mounted display device.

10. The interactive display device of claim 8, further comprising:
a second portable device that is distinct from the electronic device and the first portable device.

11. The interactive display device of claim 10, wherein:
the second portable device includes a plurality of light sources each configured to emit light of a respective wavelength selected from a plurality of distinct wavelengths, including a first light source configured to emit light of a first wavelength selected from the plurality of distinct wavelengths and a second light source, distinct from the first light source, configured to concurrently emit light of a second wavelength, distinct from the first wavelength, selected from the plurality of distinct wavelengths.

12. A method performed by an electronic device in communication with a first portable device and one or more optical sensors, the method comprising:

receiving information identifying respective intensities of light, detected by the one or more optical sensors, for a plurality of distinct wavelengths;

selecting a first set of one or more distinct wavelengths for tracking the first portable device based on the respective intensities of light, detected by the one or more optical sensors, for the plurality of distinct wavelengths, wherein the first set of one or more distinct wavelengths is distinguishable from ambient light; and, subsequent to selecting the first set of one or more distinct wavelengths for tracking the first portable device:

initiating the first portable device to emit light of the first set of one or more selected wavelengths;

receiving information identifying one or more respective intensities of light, detected by the one or more optical sensors, for the first set of one or more selected wavelengths; and determining a position of the first portable device based on the information identifying the one or more respective intensities of light, detected by the one or more optical sensors, for the first set of one or more selected wavelengths.

13. The method of claim 12, wherein:

the light for the plurality of distinct wavelengths is detected by the one or more optical sensors while the first portable device is not emitting light of the first set of one or more selected wavelengths.

14. The method of claim 12, wherein:

the first set of one or more distinct wavelengths is selected based on at least one or more wavelengths of light selected for emission by one or more portable devices, other than the first portable device, that are in communication with the electronic device.

15. The method of claim 12, wherein:

the first set of one or more distinct wavelengths includes two or more distinct wavelengths; and the method includes, subsequent to selecting the first set of one or more distinct wavelengths for tracking the first portable device:

selecting respective intensities of light for the two or more distinct wavelengths;

initiating the first portable device to emit light of the two or more selected wavelengths in accordance with the selected respective intensities of light for the two or more distinct wavelengths;

receiving information identifying respective intensities of light, detected by the one or more optical sensors, for the two or more distinct wavelengths; and determining the position of the first portable device based on the information identifying the respective intensities of light, detected by the one or more optical sensors, for the two or more distinct wavelengths.

16. The method of claim 12, further comprising:

selecting a second set of one or more distinct wavelengths for tracking a second portable device that is in communication with the electronic device; and, subsequent to selecting the second set of one or more distinct wavelengths for tracking the second portable device:

initiating the second portable device to emit light of the second set of one or more selected wavelengths;

receiving information identifying one or more respective intensities of light, detected by the one or more optical sensors, for the second set of one or more selected wavelengths; and determining a position of the second portable device based on the information identifying the one or more respective intensities of light, detected by the one or more optical sensors, for the second set of one or more selected wavelengths.

17. The method of claim 16, including:

initiating the second portable device to emit light of the second set of one or more selected wavelengths while the first portable device is emitting light of the first set of one or more selected wavelengths.

18. The method of claim 16, including:

selecting a third set of one or more distinct wavelengths for tracking a third portable device that is in communication with the electronic device; and, subsequent to selecting the third set of one or more distinct wavelengths for tracking the third portable device:

initiating the third portable device to emit light of the third set of one or more selected wavelengths;

receiving information identifying one or more respective intensities of light, detected by the one or more optical sensors, for the third set of one or more selected wavelengths; and determining a position of the third portable device based on the information identifying the one or more respective intensities of light, detected by the one or more optical sensors, for the third set of one or more selected wavelengths.

* * * * *